United States Patent [19]

Esteban

[11] 3,794,816

[45] Feb. 26, 1974

[54] DIGITAL FILTERS WITH IMPULSE RESPONSE MODIFIED BY DATA CIRCULATIONS OCCURRING BETWEEN SUCCESSIVE DATA INPUTS

[75] Inventor: Daniel Jacques Esteban, La Gaude, France

[73] Assignee: International Business Machines Corporation, Armonk, N.Y.

[22] Filed: Mar. 17, 1972

[21] Appl. No.: 235,690

[30] Foreign Application Priority Data

Mar. 17, 1971 France ............................ 71.10484

[52] U.S. Cl. .................... 235/152, 235/156, 333/18
[51] Int. Cl. ............................................. G06f 1/02
[58] Field of Search ........ 235/152, 156; 333/18, 28; 325/42

[56] References Cited

UNITED STATES PATENTS

| | | | |
|---|---|---|---|
| 3,648,171 | 3/1972 | Hirsch | 333/18 X |
| 3,597,541 | 8/1971 | Proakis et al. | 333/18 UX |
| 3,676,804 | 7/1972 | Mueller | 333/18 |
| 3,651,316 | 3/1972 | Gibson | 333/18 X |
| 3,633,014 | 1/1972 | Lemp et al. | 235/152 |

*Primary Examiner*—Felix D. Gruber
*Assistant Examiner*—James F. Gottman
*Attorney, Agent, or Firm*—Robert B. Brodie

[57] ABSTRACT

In a digital filter to which is applied a succession of binary coded input signals $X(NT)$, $X(NT-T)$, $-X(NT-iT)$ $-$ $X[NT(N-1)T]$ at a frequency $F=1/T$, the filter output in the time domain at time $NT$ being related to the input by the approximation $$y(NT)=\frac{1}{T}\sum_{i=0}^{r} H(iT)X(NT-iT)$$

where $r$ being the number of input digits that can be simultaneously weighted, $h(iT)$ being the filter impulse response or coefficient at frequency $F$. Usually, such filters exhibit a comb type impulse response spectrum of the form $$Y(jw) = 1\text{-}e^{-jwt} = 2/\text{sin weight}/\ 2.$$

It has been found that if during the interval $T$ between application of successive input pulses, the present input is repeatedly weighted and combined at a rate $(n/T)$ of which $m$ out of $n$ results are retained, then the filter impulse response spectrum becomes modified to one having the form $$Y(jw) = [\sin(mwT/2n)]/[\sin(wT/2n)]$$

The secondary lobes of the spectral response being controlled by the judicious choice of the ratio $m$ out of $n$. In the preferred embodiment the coefficient weighting and combining of two consecutive input samples are repeated $m$ times at the rate $n/T$.

4 Claims, 9 Drawing Figures

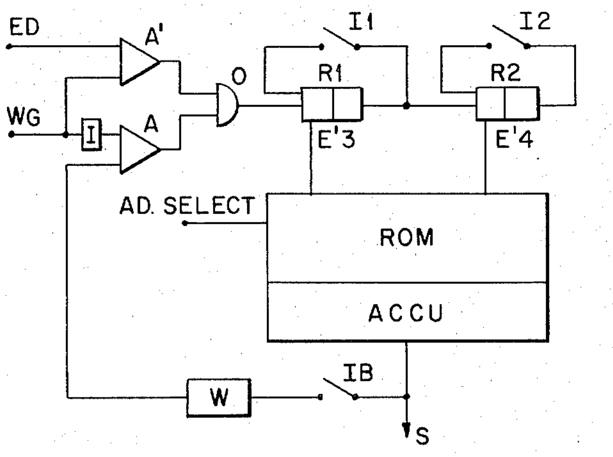

FIG. 3b

FIG. 3c

| TIME | AD SELECT | R1 | | R2 | | FILTERED SAMPLES |
|---|---|---|---|---|---|---|
| t1 | 1 | $X^1$ | 0 | 0 | 0 | $Y_A^1$ |
| t2 | 1 | $Y_A^1$ | $X^1$ | 0 | 0 | $Z_A^1$ → |
| t3 | | $X^1$ | $Y_A^1$ | 0 | 0 | |
| t4 | 0 | $Y_A^1$ | $X^1$ | 0 | 0 | $Z_B^1$ → |
| t5 | 0 | $X^1$ | $Y_A^1$ | 0 | 0 | $Y_B^1$ |
| t6 | 1 | $Y_B^1$ | $X^1$ | $Y_A^1$ | 0 | $Z_A^2$ → |
| t7 | | $X^1$ | $Y_B^1$ | 0 | $Y_A^1$ | |
| t8 | 0 | $Y_B^1$ | $X^1$ | $Y_A^1$ | 0 | $Z_B^2$ → |
| t9 | 1 | $X^2$ | $Y^1$ | $X^1$ | $Y_A^1$ | $Y_A^2$ |
| t10 | 1 | $Y_A^2$ | $X^2$ | $Y_B^1$ | $X^1$ | $Z_A^3$ → |
| t11 | | $X^2$ | $Y_A^2$ | $X^1$ | $Y_B^1$ | |
| t12 | 0 | $Y_A^2$ | $X^2$ | $Y_B^1$ | $X^1$ | $Z_B^3$ → |
| t13 | 0 | $X^2$ | $Y_A^2$ | $X^1$ | $Y_B^1$ | $Y_B^2$ |
| t14 | 1 | $Y_B^2$ | $X^2$ | $Y_A^2$ | $X^1$ | $Z_A^4$ → |
| t15 | | $X^2$ | $Y_B^2$ | $X^1$ | $Y_A^2$ | |
| t16 | 0 | $Y_B^2$ | $X^2$ | $Y_A^2$ | $X^1$ | $Z_B^4$ → |

DIGITAL FILTERS WITH IMPULSE RESPONSE MODIFIED BY DATA CIRCULATIONS OCCURRING BETWEEN SUCCESSIVE DATA INPUTS

SUMMARY OF THE INVENTION

This invention relates to a digital filtering device of the recursive or transversal type in which the number of weighting factors is modified by data circulations.

If digits representing for instance an analog signal are presented to a digital filter at a fixed rate $1/T$, then how may one increase the resolution of the filter. One solution would be to reconvert the signal from digital to analog and sample the reconstituted analog wave at a higher sampling frequency. If the original analog signal were sampled at $F_o$ and $F_o < F_{Nyquist}$, then reconstituting and resampling at $F_o' > F_o$ would permit better resolution. The term resolution, as used here, means the ability to more accurately interpolate magnitudes between sample intervals. Another approach would be to increase the interval, i.e., the number of input samples over which the binary coded input signals would be weighted and algebraically combined. This self-evidently leads to an increase in the number of register stages and coefficient multipliers. Furthermore, in those embodiments where coefficient weighting is performed by table look-up of a memory by the contents of a register, then the fabrication of a large capacity ROM with many inputs becomes costly.

The invention contemplates a solution having the functional equivalence of increasing the resolution of a time domaintransversal filter by increasing the number of taps. This equivalence is obtained by recirculating and recomputing the filter output using the contents of the same register a predetermined number of times in the interval between shifting of the next input signals into the register, i.e., interval between the digit $X(NT)$ and $X(NT-T)$ where $1/T$ is the digit rate. Usually transversal filters exhibit a comb type impulse response spectrum of the form $Y(jw) = 1-e^{-jwt} = 2/\sin(wt/2)/$, in the absence of the invention. However, it has been found that if during the interval $T$ between application of the successive input digits, the present input is repeatedly weighted and combined at the rate $n/T$ of which $m$ out of $n$ results are retained, then the transversal filter response spectrum becomes modified to one having the form $$Y(jw) = [\sin(mwt/2n)]/[\sin(wt/2n)].$$

Another object of this invention is to provide a filter the pulse response of which is defined by a much higher number of points than the number of weighting factors really in use.

BRIEF DESCRIPTION OF THE DRAWINGS

The foregoing and other objects, features and advantages of the invention will be apparent from the following more particular description of the preferred embodiments of the invention as illustrated in the accompanying drawings.

FIG. 3B illustrates the invention as applied to a digital filter of the recursive type.

FIG. 3C is the timing diagram of the filter embodied in FIG. 3B. Of interest, is the fact that intermediate values are reinserted into the input sequence.

DESCRIPTION OF THE PREFERRED EMBODIMENTS

Figure 1:
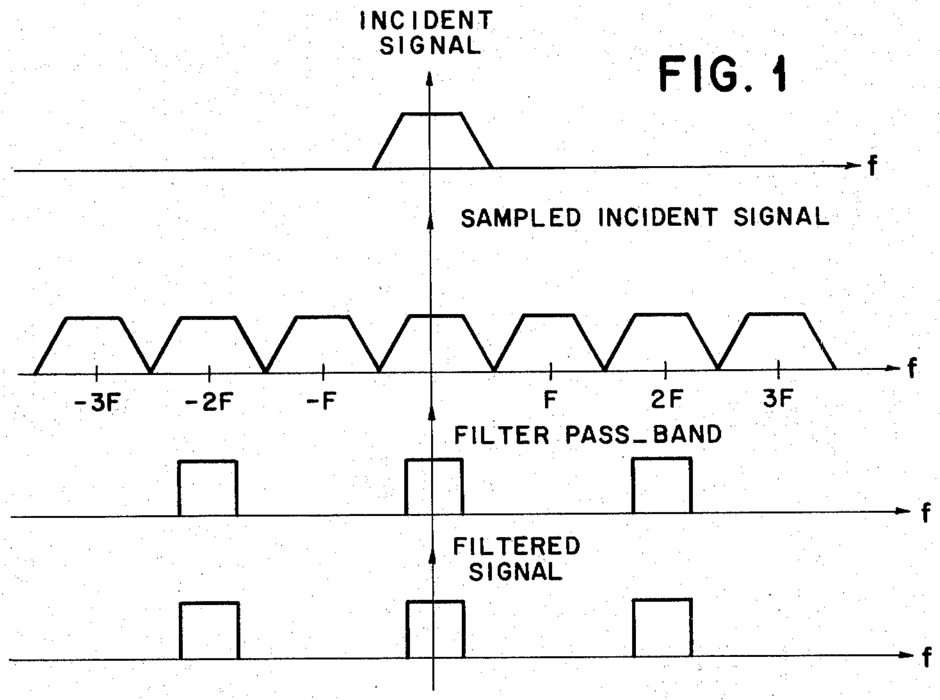
FIG. 1 shows the spectrum of a pulse type signal, the narrow pass band of a digital filter, and the resulting spectral distribution of either the incident signal or the filter response as the sampling frequency is increased by integral multiples.

To obtain the desired result, the number of weighting factors of the simulated filter is not, in fact, modified, but the modifications are carried out at the level of the sampling frequency of the incident signal to be filtered. To understand the involved phenomenons fully, it may be useful to recall certain information of the sampling theory and of the conventional signal processing techniques. This shows that when an incident analog signal is sampled at a frequency $F$, the spectrum of the resulting signal is periodical of the comb type. This means that the representation, in the frequency domain of the sampled signal causes the spectrum of the original analog signal to re-appear around each of the sampling frequency harmonics. The conclusions apply not only to the incident signal itself, but also enable the understanding of the consequences of the digitalization which constitutes the sampling of the pulse response. To clarify the explanation, it is useful to recall that in the case of a transversal filter, the weighting factors indicated above are obtained by sampling the pulse response. Thus, the filter pulse response is not continuously in use, but in a discontinuous manner. This means that the bandwidth of the sampled resulting filter is itself, of the comb type, this comb cuasing the bandwith or spectrum of the filter initially defined by its pulse response, to appear around each of the harmonics of the sampling frequency of this response. As previously indicated, the filtered signal has for spectrum, the product of the spectrum of the incident signal of the spectrum of the filter. Since the incident signal and the pulse response have been sampled, the resulting signal is itself obtained as samples and its spectrum is periodical. This spectrum is obtained by the product of two combs in the frequency domain. To modify the sampling frequency, the unecessary lobes of the comb should be eliminated and those which correspond to the new sampling frequency should be retained. Since the spectrum of the resulting signal is equal to the product of two comb spectrums, to have a correct filtering, it is necessary that the lobes of the two combs appear at same locations in the frequency domain and do not overlap. This explains why, in general, the sampling frequencies of the incident signal and of the pulse response are identical. This frequency should be at least equal to the Nyquist frequency concerning the original signal to be filtered, which is well known by those skilled in the art. But, in theory, it is not required to choose the same sampling frequency for the incident signal and the pulse response. Therefore, the resulting spectrum being equal to the product of two spectrums, to modify its appearent sampling rate, it is possible to modify indifferently the sampling frequency of either one of the product terms. In summary, if one desires to improve the filter definition, one must increase the sampling frequency of the pulse response and the same result could be obtained by simply increasing the sampling rate of the signal. FIG. 1 shows the result of the filtering of an incident signal sampled at frequency $F$ by a filter sampled at $2F$, the pass-band of the filter being limited to $F/2$. The method applied for this filtering will be subsequently treated. This figure well shows that the recovery of the filtered analog signal can be obtained more easily since the lobes are more separated. But, which is more important is the fact that the same result may be obtained by working not the pulse response, but the incident signal. In fact, if one increases the sampling frequency of the incident signal without modifying the number of weighting factors, certain lobes of the resulting signal will, however, disappear. Thus, the result is quite similar to the result which would be obtained by using a filter the pulse response of which would have been defined by using a higher number of points. Therefore, this corresponds to a virtual increase of the number of weighting factors, at a ratio equal to the one of the increase of the sampling frequency of the incident signal.

From the foregoing, one can understand the operation of the device of this invention, device in which a better filtering definition is obtained while maintaining a number of weighting factors relatively low and increasing the sampling frequency of the incident signal. In fact, in many applications, the sampling frequency cannot be controlled: namely, this is the case when the digital filtering is to be carried out at the level of a transmission system receiver. But is is possible to simulate this increase by repeating each sample several times during a same period and by allowing the filter to eliminate the discontinuities by working the interpolations between the successive samples. Mathematical studies show that the target objects can be obtained by not only working on the repetition frequency of a same sample, but also by working on the number of repetitions which are finally retained during each period of time. For a good understanding of that, one can start from the following hypothesises: initial signal $X(t)$ provides samples $X(NT)$ where $N$=1, 2, 3 . . . at frequency $F = 1/T$ between $X(NT)$ and $X(NT+T)$ the signal is repeated $n$ times, therefore at frequency $n/T$ and only $m$ repetitions are effectively retained. If one assumes that the amplitude of the initial sample is equal to the unity, the device performing the above operations has a transfer function in complex plan $G_1(p)$, where $p$ is the Laplace Carson variable, such that:

$$G_1(p) = 1 + e^{-(T/n)p} + e^{-2(T/n)p} + \ldots + e^{-(T/n)\,(m-2)p} + e^{-(T/n)\,(m-1)p} \qquad (1)$$

since the time interval between two successive repetitions is equal to $T/n$.

By multiplying equation (1) by $e^{-(T/n)p}$, one obtains $$G_1(p) \cdot e^{-(T/n)p} = e^{-(T/n)p} + e^{-(2T/n)p} + \ldots + e^{-(m/n)Tp}. \qquad (2)$$

By combining equations (1) and (2), one obtains very simply:

$$G_1(p) = [1 - e^{-(m/n)Tp}]/[1 - e^{-(T/n)p}]. \qquad (3)$$

Equation (3) enables to determine the spectrum of the signal obtained by repeating sample $X(NT)$, by substituting $j\omega$ for $p$.

$$G_1(j\omega) = \frac{1-e-\frac{mT}{n}j\omega}{1-e-\frac{T}{n}j\omega} \qquad (4)$$

Equation (4) may be written as follows:
Recalling the identity $$1-e^{-jwT} = 2/\sin\,(wT/2)/$$

One can now write $$\bar{G}_1(jw) = [2/\sin(mwT/2n)/]/[2/\sin(wT/2n)/]$$

Therefore $$G_1(jw) = |[\sin(mwT/2n)]/[\sin(wT/2n)]|$$

Figure 2:
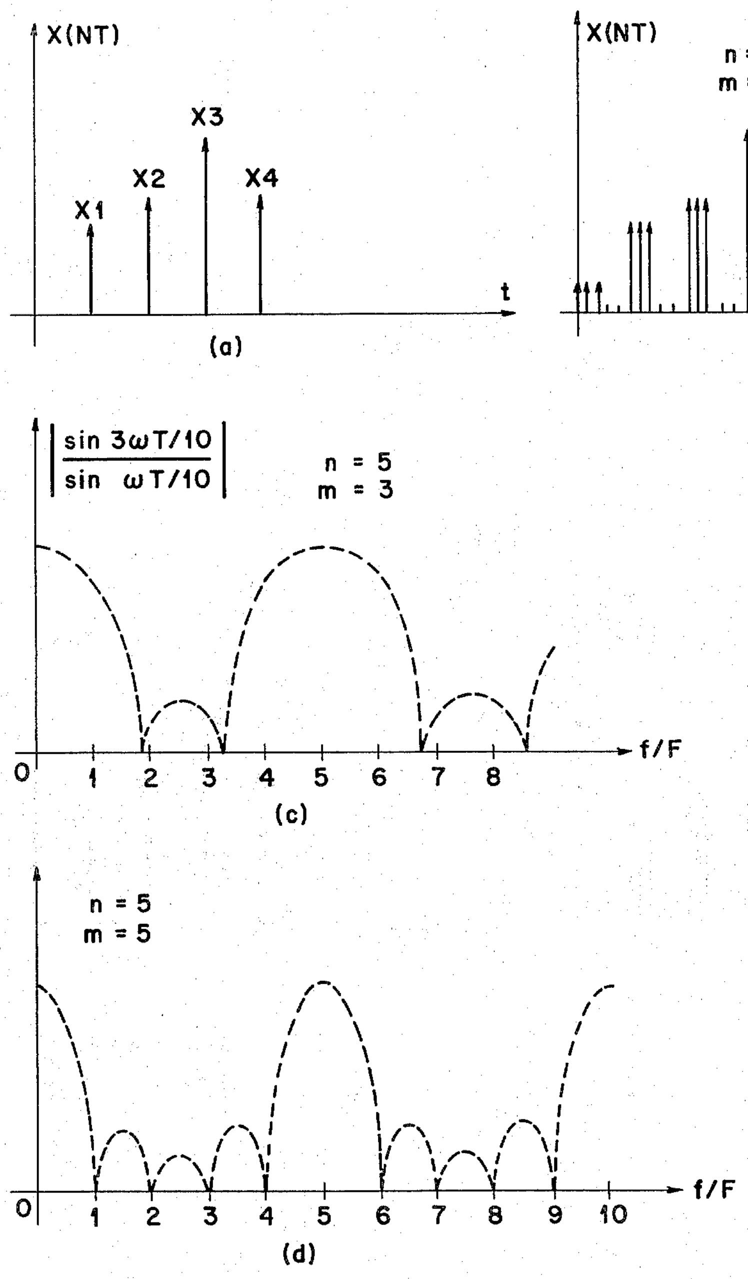
FIG. 2A illustrates the response in the time domain of a digital filter to successive samples applied to the filter at rate $1/T$. In contrast, FIG. 2B sets forth the advantage of replicating the filter response in the interpulse interval $T$ by reweighting and recombining the input digits $m$ times at the rate of $n/T$ where $m<n$.
FIG. 2C and 2D are the comb type filter responses in the frequency domain modified by reweighting and recombining the input digits. Note, the significance of the secondary lobes varies as the ratio $m/n$.

FIG. 2 shows the meaning of the phenomenons indicated above, in the particular case taken as an example where $n$=5 and $m$=3 and 5. FIG. 2a shows in the time domain, an initial signal sampled at frequency $F=(1/T)$. After repetition of each sample at frequency $5F$, and retaining of three repetitions only, the resulting signal looks like FIG. 2b. The spectrum resulting from the filtering by repetition of the samples looks like FIG. 2c. It is a spectrum the envelope of which comprises main lobes repeating every $5T$, and also secondary lobes. Its envelope is defined by the equation:

$$|(\sin 3\omega T/10/\sin \omega T/10)|.$$

If one wants to reduce the importance of the secondary lobes, it is necessary to work on ratio $m/n$. FIG. 2d shows the case where $m=n=5$.

Whatever the value of $m$ may be, what is essential for this invention is to note the lobe periodicity and in particular, the main lobe periodicity. Consequently, the treatment of signal $X(t)$ in accordance with the above process, enables to obtain the desired result. Namely, in the selected case, by passing this signal through a filter the pulse response of which is defined by points separated from $T$, everthing will work as if these points were separated by $T/5$, therefore were five times more numerous. In fact, as this will be subsequently indicated, the repetitions of a same sample are performed by re-circulations in a same register.

This invention can be applied to the realization of digital filters of any type. Namely, the filter can be recursive or transversal, of the type using delay lines and modulators, or of the type using memories containing the weighted partial results such as the one described in U. S. Pat. application 208,345 filed in the United States on Dec. 15, 1971, and entitled "Improvements in Digital Filters."

The present invention can be applied to recursive filters of all types such as the one defined in said patent application, it is possible to apply this invention very simply to it. It is sufficient to modify the memory contents and to add some external registers to memorize the sample repetitions. The repetition operations can be carried out in particular by using a device including a memory element which can contain a sample which would be caused to re-circulate. When the sample words are digitally coded, this memory element is a register having the dimension of a word.

This invention can be well understood from a simple example: One considers a transversal filter with four weighting factors, for which $m$=1 and $n$=2. The weighting factors will be called $\alpha$, $\beta$, $\gamma$ and $\delta$ and the samples of signal $X(t)$ at times $NT$ will be called $X^1$, $X^2$ . . . One can see very simply that, since $m$=1 and $n$=2, a zero is located between two samples. Thus, the data will appear in front of the weighters of the filter as follows:

| t | α | B | γ | δ | |
|---|---|---|---|---|---|
| T | $X^1$ | 0 | 1 | O | $Y_A^1 = \alpha X + \gamma$ |
| | O | $X^1$ | O | 1 | $Y_B^1 = BX + \delta$ |
| 2T | $X^2$ | O | $X^1$ | O | $Y_A^2 = \alpha X^2 + \gamma X^1$ |
| | O | $X^2$ | O | $X^1$ | $Y_B^2 = BX^2 + \gamma X^1$ |
| 3T | $X^3$ | O | $X^2$ | O | $Y_A^3 = \alpha X^3 + \gamma X^2$ |
| | O | $X^3$ | O | $X^2$ | $Y_B^3 = BX^3 + \delta X^2$ |
| — | — | — | — | — | |
| — | — | — | — | — | |
| NT | $X^N$ | O | $X^{N-1}$ | O | $Y_A^N = \alpha X^N + \gamma X^{N-1}$ |
| | O | $X^N$ | O | $X^{N-1}$ | $Y_B^N = BX^N + \delta X^{N-1}$ |

Thus, the operation is cyclical: the sample of the filtered signal is $Y_A$ then $Y_B$ alternatively. More generally, when a sample $X^n$ is introduced into the filter, the latter supplies a sample of filtered signal $$Y_A^N = \alpha\, X^N + \gamma\, X^{N-1} \quad (5)$$

then, before sample $X^{N-1}$ reaches the input, the device delivers a second sample of the filtered signal, $Y_B$ such as:

$$Y_B^N = \beta\, X^N + \delta\, X^{N-1} \quad (6)$$

Expressions (5) and (6) show that between $Y_A$ and $Y_B$, only the weighting factors are modified. In other words, if one uses a filter such as the one described in Pat. application 208,345 indicated above, it is sufficient to maintain the same data in the adressing registers of the ROM and to use an adressing bit AD Select which will be 1, then 0, alternatively and will choose $Y_A$ then $Y_B$ alternatively.

A device enabling the implementation of the filter described above may be performed as shown on FIG. 3. At time $NT$, $X^N$ arrives at input ED, register R1 contains sample $X^{N-1}$ and R2 contains $X^{N-2}$, switches I1 and I2 are opened, $X^N$ enters into R1 and $X^{N-1}$ is transmitted from R1 to R2, while $X^{N-2}$ is expelled from R2.

During this transfer, AD select = 0, the bits of same weights of $X^N$ and $X^{N-1}$ adressing the ROM followed by an accumulator Accu are used to calculate $Y_A^N$ in accordance with the process of the patent applications indicated above. Then, between $NT$ and $(N+1)T$, I1 and I2 are closed, $X^N$ and $X^{N-1}$ are respectively fedback into R1 and R2 and are used to calculate $Y_B^N$. At time $(N+1)T$, I1 and I2 are re-opened, word $X^{N+1}$ arrives in (ED) and the above process starts again, and so on, until there is no more input words.

Figure 3:
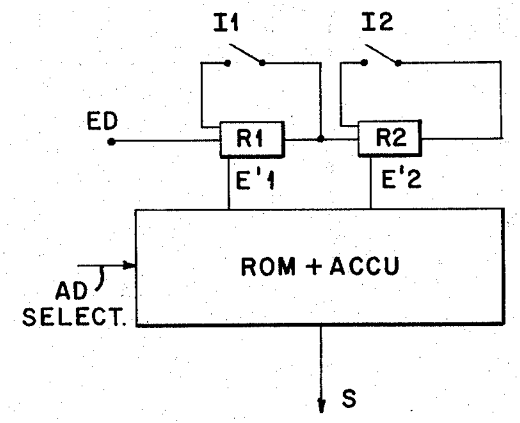
FIG. 3 sets forth the recirculation of data according to the invention occurs within a digital filter of the type where coefficient weighting is performed by table look up and the combining of the weighted digits is executed by an accumulator.
Figure 3A:
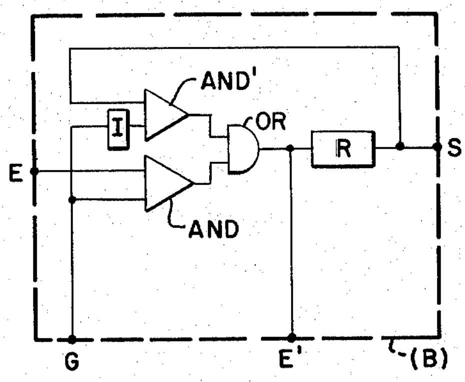
FIG. 3A represents a logical modification of the recirculation of the data contained in a register during the interpulse interval.

The circuit formed by register R, switch I and the control logic circuit may be realized as the diagram of circuit (B) shown on FIG. 3$a$. This device includes a data input E, a control input G and a data output S. Samples $X^N$ arriving in E enter into register R through an AND gate and an OR logic circuit. The data coming out at S are fedback to the input of same register R through a gate AND′ and the same OR circuit. A logic signal $G$=1 controls the opening of the AND, its reciprocal $G$=0 controls the opening of the AND′. In order that the AND and AND′ be opened and closed or inversely, respectively, as time $t=NT$ or $NT>t>(N+1)T$, input $G$ is common to both gates, but an invert circuit I is placed at the control input of AND′. The input of register R is connected to a terminal E′ from which the data adressing the ROM are taken.

The diagram of FIG. 3$b$ has been choosen to illustrate this process. This process differs from the one of FIG. 3 only by the increase of the capacity of registers R1 and R2 by two ($n$=2) and by the addition of a logic circuit enabling the re-circulation of the intermediate samples of the filtered signals issued from the accumulator. A register ($w$) enables to introduce a delay of a word-time on the recirculation path. For this purpose, output S has been looped through ($w$) and switch $I_B$, to the input of a gate A while samples $x(NT)$ arrive at ED on a gate A′. A signal WG enables to control openings and closings of A and A′, either directly (case of A′), or after having been reversed in $I$ (case of A). The outputs of A and A′ enter into R1 through a logic OR circuit (0).

The timing diagram of FIG. 3$c$, associated to FIG. 3$b$, enables a better understanding of the operation of this one. At time $t1$, sample $X^1$ arrives at ED, finds A′ open and enters into the left hand section of R1. Input AD select is at logic level 1, the filter provides samples $Y_A^1$ which is used as an intermediate filtered sample. Thus, it is not collected at the output, but re-applied to the input of A through $I_B$ and ($w$). At time $t2$, $X^1$ is shifted towards the right hand section of R1 by introduction of $Y_A^1$ and the filter delivers $Z_A^1$, AD Select being at logic level one and $I_B$ opened. This word goes out and constitutes the first useful sample of the filtered signal. At time $t3$, I1 and I2 are closed. This permits the word order contained in each of the registers R1 and R2 to be recirculated. On time $t$4, AD Select passes at zero level, $I_B$ is opened, a new circulation is performed in looped R1 and R2 and the filter provides $Z_B^1$. At time $t5$, $I_B$ is closed, a new circulation is performed in R1 and R2 and the filter provides $Y_B^1$ which is delayed of a word time by ($w$). On time $t6$, I1 and I2 are opened, $WG$=0, thus A′ is closed and A opened, AD Select=1, $Y_B^1$ enters into the left hand section of R1, shifting the contents of R1 and R2 of one word position to the right. Then, the filter provides a third useful sample $Z_A^2$. Then, $I_B$ is opened, at $t7$, I1 and I2 are closed, registers R1 and R2 are looped on themselves. On time t8, AD Select=0, R1 and R2 are looped on themselves again and the filter delivers thu fourth useful sample $Z_B^2$. Then, at $t9$, a new sample $X^2$ appears in ED and the process described above starts again all over.

The above filter has been described for two intermediate re-circulations but it should be understood that this number does not constitute a maximum and that the number of intermediate re-circulations only depends of the choice of the initial $n$. However, one should note the increase of computing time involved by this. As the working speeds of the calculation circuits are technologically limited, it may be useful to find circuit arrangements requiring minimum handling. A solution is provided by mounting registers R in parallel instead of in series.

Figure 4A:
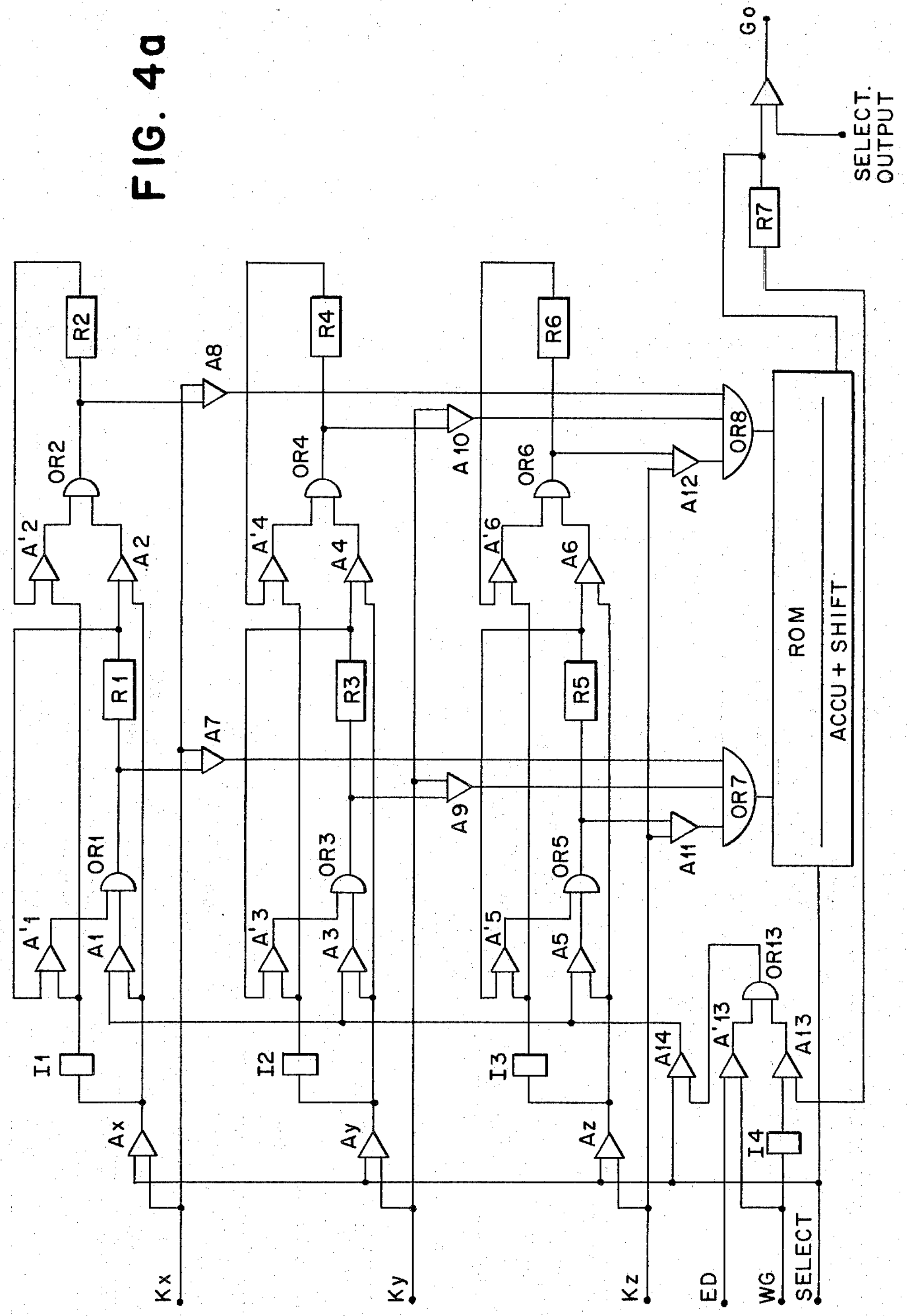
FIGS. 4A and 4B show a detailed embodiment and timing diagram in which different patterns of recirculation among different registers are set forth.

FIG. 4a is a representation of this for a number of intermediate re-circulations limited to two and thus includes three stages of superposed registers R and controlled by signals applied in KX, KY or KZ.

Figure 4B:
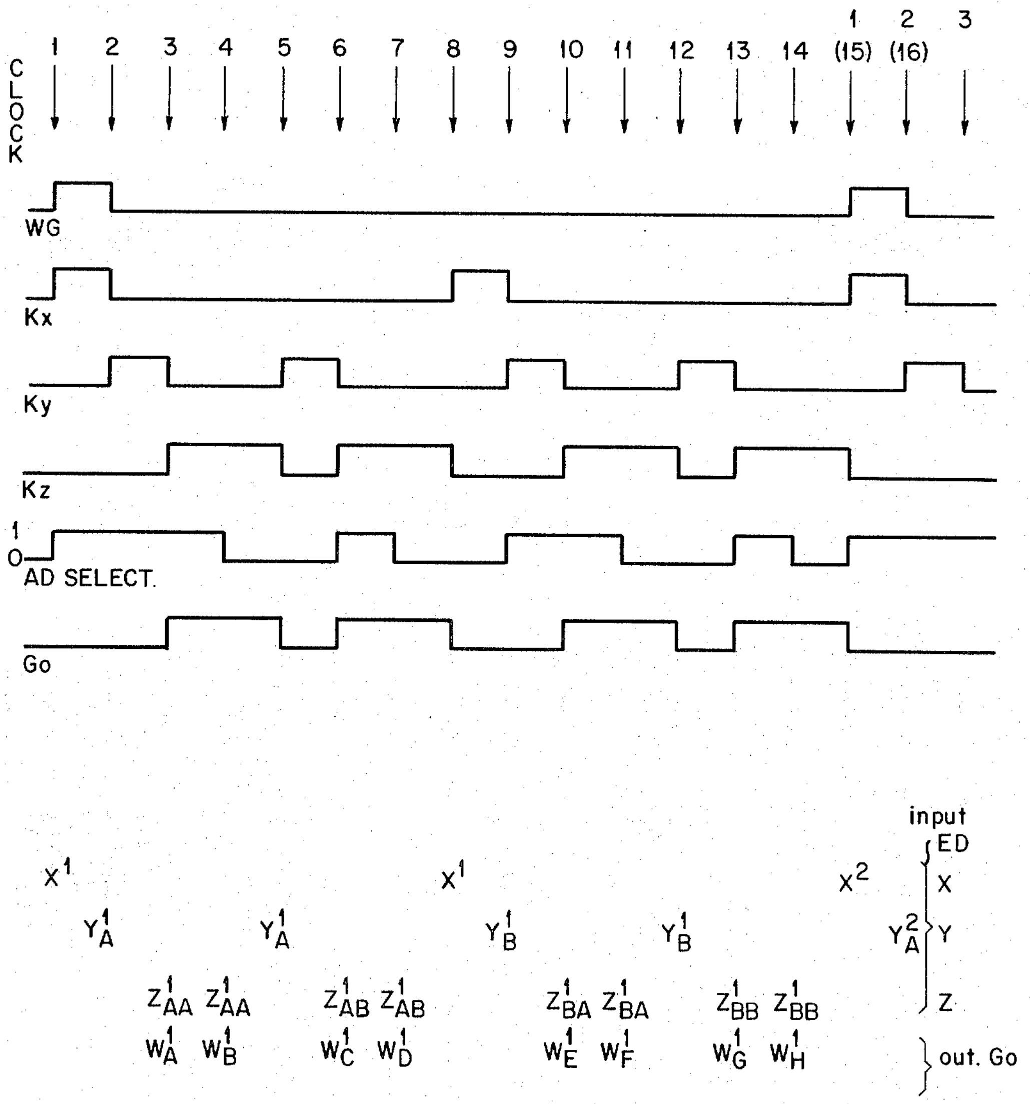

FIG. 4b shows the timing diagram of the operation of the device shown on FIG. 4a. Period $T$ has been divided into fourteen intervals of equal duration. On time $t1$, sample $X^1$ arrives at input ED and finds AND gate A' 13 opened by control signal $WG=1$. It goes through OR logic circuit OR13 and gate A14 on time signal AD Select is at logic level 1. At this time, control logic level KX=1, therefore $X^1$ enters into register R1 through A1 and OR1 while the word previously contained in R1 passes in R2. During this operation, sample $Y_A^1$ is instantaneously calculated by the filter adressed through A7, OR7 and A8, OR8. It is provided at the output of the accumulator and finds gate Go closed. Then, it is delayed of a word time by R7 and re-applied to the input of A13. In fact, element R7 may be saved since the delay is provided by the accumulator. At time $t2$, level AD Select = 1, $\overline{WG}=1$ and $KY=1$, sample $Y_A^1$ enters into R3 through A13, OR13, A14, A3 and OR3. The contents of R3 is transfered into R4 and word $Z_{AA}^1$ is provided by the filter adressed through A9, OR7 and A10, OR8. This word finds Go closed, it is delayed by R7 and enters, on time $t3$, into R5 through A13, OR13, A14, A5 and OR5 by driving $Z_{AA}^{-1}$ out. On the way, configuration $Z_{AA}^1$ addresses the ROM, control AD Select of which =1 and produces, at the output of the filter, a word $W_A^1$ which finds Go opened and goes out of the filter. In fact, the above re-circulation operations could theoritically proceed, but they are restricted by the ratio between sampling period $T$ and the operating-cycle of the circuits. As soon as $W_A^1$ is extracted from the filter, AD Select= 0, therefore the output of $Az=0$, which closes AND gates A5 and A6 due to the presence of I3. On time $t4$, $KZ=1$, and word $Z_{AA}^1$, $Z_{AA}^{-1}$ is used again to address the ROM, but as AD Select =0, the accumulator provides $W_B^1$ at the filter output. At this time, gate Go is opened. At time $t5$, $KY=1$ and AD Select=0, therefore the filter addressed by the configuration $Y_A^1$, $Y_A^{-1}$ provides $Z_{AB}^1$. This word finds Go closed and is delayed of a word by R7. At time $t6$, AD Select=1, therefore $Z_{AB}^1$ enters into R5 and $Z_{AA}^1$ is transferred towards R6. Word $Z_{AB}^1$, $Z_{AA}^1$ enables $W_C^1$ to be provided at the filter output since Go is opened. AD Select becomes null, therefore A'5 and A'6 are opened while A5 and A6 are closed. At $t7$, $KZ=1$, and AD Select=0, therefore $Z_{AB}^1$ $Z_{AA}^1$ provides $W_D^1$ which finds Go opened. Control $KX$ passes at logic level 1 at $t8$ but AD Select=1, which enables to obtain $Y_B^1$. Then, the above cycle starts again from $t9$ to $t14$, providing the sample words of filtered signal $W_E^1$, $W_F^1$, $W_G^1$ and $W_H^1$. At time $t15$, control WG passes again at level 1 and sample $X2$ enters into R1, $X^1$ passes into R2 and the above cycle starts again.

In addition, it should be noted that at any time from $t1$ to $t14$, inputs KX, KY or KZ which are not at level 1 enables registers R to which they correspond, to be re-looped on themselves. This enables to carry out some re-loopings of register R and some calculations simultaneously, therefore to save time.

Figure 5:
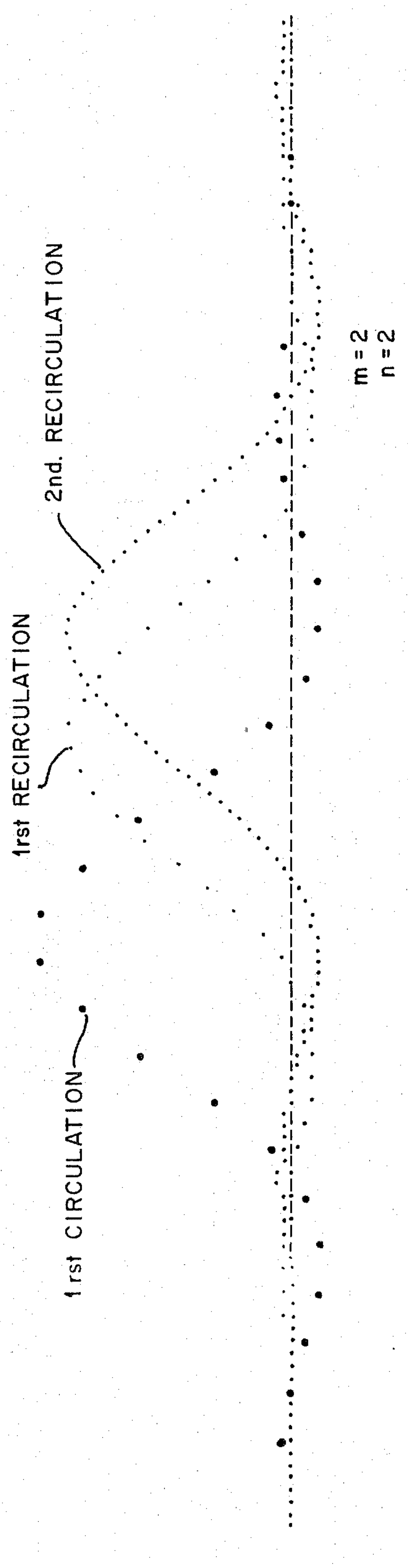
FIG. 5 illustrates the improvement in resolution of the filter impulse response occassioned by recirculation.

FIG. 5 shows the effect of the re-circulations on the filter response for $m=2$ and $n=2$. Starting from a curve obtained using the device of FIG. 3, and defined by 25 points approximately, one obtains after two re-circulations, a pulse response defined by 100 points approximately.

It should be well understood that the choice of $m$ and $n$ is arbitrary, the only condition being that $m$ and $n$ be a whole number. In addition, the number of factors is minimized by taking $n=2$. The repetition of the samples and their re-circulation may be either applied to a transversal or to a recursive filter.

While the invention has been particularly shown and described with reference to a preferred embodiment thereof, it will be understood by those skilled in the art that various changes in form and detail may be made without departing from the spirit and scope of the invention.

What is claimed is:

1. In a digital filter comprising:

an $r$ stage shift register;

means for applying a succession of binary coded signals $X(NT)$, $X(NT-T)$—$X(NT-iT)$—to the register at the rate $F=1/T$;

means responsive to the shift register contents for forming an output signal in the time domain according to the convolution relation $$y(NT)=\frac{1}{T}\sum_{i=0}^{r} H(iT)X(NT-iT)$$

where $h(it)$ is the filter impulse response weighting coefficient; wherein the digital filter further includes:

means operative during the time interval $T$ between application of successive signals into the register for repeatedly forming the output signal according to the convolutional relation at a rate $(n/T)$ of which $m$ out of $n$ results being retained, $m<n<(1/T)$, the filter exhibiting thereby a comb type spectrum in the frequency domain of the form $$Y(jw) = \left| [\sin (mwT/2n)]/[\sin (wT/2n)] \right|$$

2. In a digital filter according to claim 1 wherein the number of zero amplitudes of the comb type spectrum vary as the ratio $(m/n)$.

3. A digital filter comprising:

an $r$ stage shift register;

means for applying a succession of binary coded signals to the register at the rate $(1/T)$;

an accumulator for algebraically combining binary coded signals;

memory means for storing coefficient weighted signals in $2^r$ addressable memory locations;

means for extracting from the memory means the contents stored at the location whose address is defined by the $r$ register stages and for applying said extracted contents to the accumulator, said extracting means including means operative during the interval $T$ occurring between successive application of signals to the register for repeatedly extracting from memory and applying the contents thereof to the accumulator at a rate of $(n/T)$ of which $m$ out of $n$ results being retained, $m<n<(1/T)$.

4. A digital filter according to claim 3, wherein the filter exhibits a comb type impulse response spectrum in the frequency domain of the form $$Y(jw) = |[\sin(mwT/2n)]/[\sin(wT/2n)]|$$

where the number of spectrum zeros varies as $m/n$.

* * * * *